United States Patent Office 3,524,848
Patented Aug. 18, 1970

3,524,848
PROCESS FOR PRODUCING BENZODIAZEPINE DERIVATIVES
Hiroaki Moriyama, Hisao Yamamoto, and Shigeho Inaba, Nishinomiya, Hideo Nagata and Toshio Tamaki, Ibaraki, and Toshiyuki Hirohashi, Kobe, Japan, assignors to Sumitomo Chemical Co., Ltd., Osaka, Japan
No Drawing. Filed Nov. 1, 1967, Ser. No. 679,625
Claims priority, application Japan, Nov. 2, 1966, 41/72,552; Nov. 16, 1966, 41/75,623; Sept. 6, 1967, 42/57,394
Int. Cl. C07d 53/06
U.S. Cl. 260—239.3                                10 Claims

---

ABSTRACT OF THE DISCLOSURE

Therapeutically useful benzodiazepines of the formula

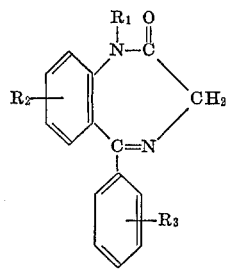

wherein $R_1$ is H or lower alkyl, and each of $R_2$ and $R_3$ is H, halogen, nitro, lower alkyl or $CF_3$ are prepared by reacting the corresponding 2-(tosyloxyacetamido)-benzophenones of the formula

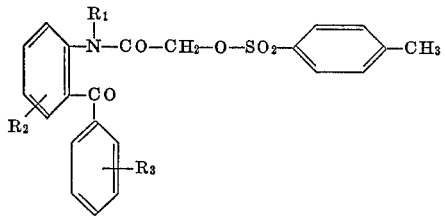

with ammonia, or by reacting a 2-aminobenzophenone of the formula

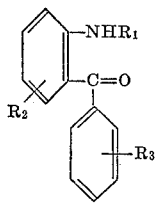

with a tosyloxyacetic acid derivative of the formula

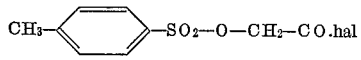

In some cases, a particular ammonia concentration gives optimal results.

---

This invention relates to a new process for producing benzodiazepine derivatives and more particularly to a new process for producing benzodiazepine derivatives represented by the Formula I,

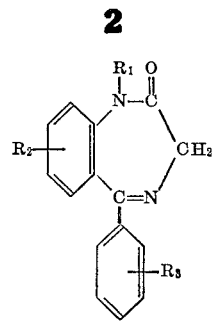

wherein $R_1$ is a hydrogen atom or lower alkyl and each of $R_2$ and $R_3$ is a hydrogen atom, halogen atom, nitro, lower alkyl or trifluoromethyl.

The present benzodiazepine derivatives obtained by the process of the present invention have excellent activities as tranquillizer, muscle relaxant, anti-convulsant and are markedly useful as a medicine.

According to the present invention, these benzodiazepine derivatives are obtained by reacting a 2-amino-benzophenone derivative represented by the Formula II,

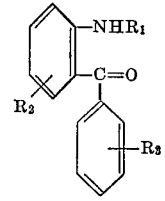

wherein $R_1$, $R_2$ and $R_3$ have respectively the same significances as defined before with a tosyloxyacetic acid derivative represented by the Formula III,

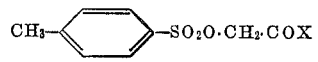

wherein X is a halogen atom, to yield a 2-(tosyloxyacetamido)-benzophenone derivative represented by the Formula IV,

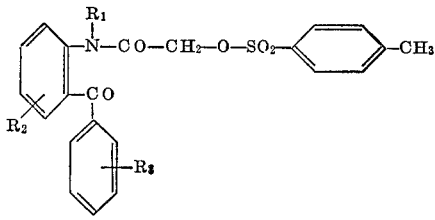

wherein $R_1$, $R_2$ and $R_3$ are respectively the same significances as defined before, and reacting the resultant 2-(tosyloxyacetamido)-benzophenone derivative (IV) with ammonia.

As known process for producing the above mentioned compounds, a process by which a 2-aminobenzophenone derivative is reacted with glycine hydrochloride or glycine ethyl ester seems to be most useful in practice (German Pat. No. 1,145,626). However, the product yield of this known method is generally very low. For example, the yield of 7-chloro-1-methyl-5-phenyl-1,3-dihydro-2H-1,4-benzodiazepine-2(1H)-one by reacting 5-chloro-2-methylaminobenzophenone with glycine ethyl ester hydrochloride in pyridine is less than 30% (German Pat. No. 1,145,626).

In the case of another known process by which a 2-haloacetamide benzophenone derivative is reacted with ammonia (Sternbach et al: Journal of Organic Chemistry, vol. 27, p. 3788 (1962) and German Pat. No. 1,136,709) the yield is also low. For example, in the process for preparing a corresponding 7-chloro-phenyl-1,3-dihydro-2H-1,4-benzodiazepine-2-one derivative by reacting 2-chloracetamido-5-chlorobenzophenone or 2-(2-bromo-N-methylacetamido)-5-chlorobenzophenone with methanolic ammonia, the yield was reported to be 33 or 46.5% respectively at most. Further, by a modified process of this known process, in which a 2-(haloacylamido)-benzophenone derivative was treated with liquid ammonia at the reflux temperature of the liquid ammonia, it has been mentioned that, in such case, the yield was considerably high. However, to the best of the inventors knowledge, the process is not commercially useful in practice.

In still another known process in which a carbobenzoxyglycine amidobenzophenone derivative is treated with hydrobromic acid in glacial acetic acid (Stempel et al: Journal of Organic Chemistry, vol. 27, p. 4675 (1962) and the British Pat. No. 985,683), the process for producing the intermediate is complicated and the yield is low.

As a result of various researches, we have invented a new process that a 2-aminobenzophenone derivative represented by the above mentioned Formula II is reacted with a tosyloxyacetyl halide represented by the Formula III to yield 2-(tosyloxyacetamido)-benzophenone derivative and the resultant product is treated with ammonia to give the desired benzodiazepine derivative represented by the above mentioned Formula I very easily in a high yield. And further, this process is more conventional and practical than any other known processes in the points of the reaction operation, yield, purification process manufacturing of starting materials and so on. Therefore, it is apparent that the present process is a most useful process.

In carrying out the process of the present invention, when a 2-aminobenzophenone derivative represented by the above mentioned Formula II is reacted with a tosyloxyacetyl halide represented by the Formula III in a proper solvent, such as chloroform, benzene, tetrahydrofuran, methylene chloride, toluene, dimethyl formamide or dimethyl sulfoxide, a 2-(tosyloxyacetamido)-benzophenone derivative represented by the above mentioned Formula IV is obtained. The reaction is carried out generally at room temperature to a boiling point of a solvent. When thereto is added hydrogen-halide acceptor, such as caustic alkali, alkali carbonate, alkali bicarbonate, triethyl amine or pyridine, the reaction proceeds more smoothly.

When the thus obtained 2-(tosyloxyacetamido)-benzophenone derivative is then treated with ammonia, a benzodiazepine derivative represented by the above mentioned Formula I can be produced very easily at a high yield. The reaction can be carried out generally at room temperature in an inert solvent such as methanol, ethanol, dioxane, tetrahydrofuran, chloroform, chlorobenzene, dimethyl formamide or dimethyl sulfoxide, suggesting the procedure to be advantageous in practical use.

However, heating of the reaction mixture causes completion of the reaction mixture in shorter time, and increasing of product yield.

The reaction of ammonia with a 2-(tosyloxyacetamido)-benzophenone derivative having no substituent at the nitrogen atom ($R_1$ is a hydrogen atom in the Formula IV) proceed easily in a lower alcohol such as methanol or ethanol containing ammonia is dissolved in usual concentration. However, in the case of the reaction of ammonia with a 2-(tosyloxyacetamido)-benzophenone derivative having an alkyl group at the nitrogen atom ($R_1$ is a lower alkyl in the Formula IV), if the concentration of ammonia is rather high, the objective benzodiazepine derivative can not be obtained in a satisfactory yield, because of by-reaction (the decomposition into a 2-alkyl aminobenzophenone derivative II). The drawback appears mostly at 10 (w./v.) percent in ammonia concentration (wherein w./v. percent represents the value of grams of ammonia contained in 100 ml. of a solution).

However, in the 0.1 to 2 (w./v.) percent of ammonia, the by-reaction, that is, the formation of a 2-alkyl aminohalo-benzophenone derivative does not proceed and the objective benzodiazepine derivative is obtained at a good yield.

When tetrahydrofuran or dimethyl formamide is used as a solvent in the reaction, the benzodiazepine derivative is obtained in good yield under the conditions of the present invention.

Further, when hydrocarbon halide, practically chloroform or chlorobenzene is used as a solvent, yield of a benzodiazepine derivative is attained over 80% and the crude product is rather pure.

The reaction is generally carried out even at room temperature and the after-treatment is rather simple. These facts suggest the present invention to be advantageous in practical use.

In such case, though the concentration of ammonia is low, the reaction yield is so high that the capacity of the required reaction apparatus based on the objective product need not be very large. Further, if ammonia is introduced in a suitable supply under a constant partial pressure, the reaction can be carried out without substantially increasing the capacity of the required reaction apparatus while keeping the reaction velocity rather high.

According to the process of the present invention, following 2-(tosyloxyacetamido)-benzophenone derivatives are, for example, easily obtained:

2-(tosyloxyacetamido)-benzophenone,
2-(N-methyl-tosyloxyacetamido)-benzophenone,
5-chloro-2-(tosyloxyacetamido)-benzophenone,
5-nitro-2-(tosyloxyacetamido)-benzophenone,
5-methyl-2-(tosyloxyacetamido)-benzophenone,
5-trifluoromethyl-2-(tosyloxyacetamido)-benzophenone,
5-chloro-2-(N-methyl-tosyloxyacetamido)-benzophenone,
5 - chloro - 2 - (N-cyclopropylmethyl-tosyloxyacetamido)-benzophenone,
6-chloro-2-(tosyloxyacetamido)-benzophenone,
4-chloro-2-(tosyloxyacetamido)-benzophenone,
3-chloro-2-(tosyloxyacetamido)-benzophenone,
2'-nitro-2-(tosyloxyacetamido)-benzophenone,
5,2'-dichloro-2-(tosyloxyacetamido)-benzophenone,
5-chloro-2'-methyl-2-(N-methyl-tosyloxyacetamido)-benzophenone,
5-chloro-3-methyl-2-(tosyloxyacetamido)-benzophenone,
5,2'-dinitro-2-(tosyloxyacetamido)-benzophenone,
3' - trifluoromethyl-2-(tosyloxyacetamido)-benzophenone,
5-chloro-4'-methyl-2-(tosyloxyacetamido)-benzophenone, and
4-nitro-2-(tosyloxyacetamido)-benzophenone.

According to the process of the present invention, following benzodiazepine derivatives are, for example, obtained:

5-phenyl-1,3-dihydro-2H-1,4-benzodiazepin-2-one,
1-methyl-5-phenyl-1,3-dihydro-2H-1,4-benzodiazepin-2-one,
5-phenyl-7-chloro-1,3-dihydro-2H-1,4-benzodiazepin-2-one,
5-phenyl-7-nitro-1,3-dihydro-2H-1,4-benzodiazepin-2-one,
5-phenyl-7-methyl-1,3-dihydro-2H-1,4-benzodiazepin-2-one,
5-phenyl-7-trifluoromethyl-1,3-dihydro-2H-1,4-benzodiazepin-2-one,
5-phenyl-1-methyl-7-chloro-1,3-dihydro-2H-1,4-benzodiazepin-2-one,
5-phenyl-1-cyclopropylmethyl-7-chloro-1,3-dihydro-2H-1,4-benzodiazepin-2-one,
5-phenyl-6-chloro-1,3-dihydro-2H-1,4-benzodiazepin-2-one, 5-phenyl-8-chloro-1,3-dihydro-2H-1,4-benzodiazepin-2-one, 5-phenyl-9-chloro-1,3-dihydro-2H-1,4-benzodiazepin-2-one, 5-(2'-nitrophenyl)-1,3-dihydro-2H-1,4-benzodiazepin-2-one, 5-(2'-chlorophenyl)-7-chloro-1,3-dihydro-2H-1,4-benzodiazepin-2-one, 5-(2'-tolyl)-1-methyl-7-chloro-1,3-dihydro-2H-1,4-benzodiazepin-2-one, 5-(3'-tolyl)-7-chloro-1,3-dihydro-2H-1,4-benzodiazepin-2-one, 5-(2'-nitrophenyl)7-nitro-1,3-dihydro-2H-1,4-benzodiazepin-2-one, 5-(3'-trifluoromethylphenyl)-1,3-dihydro-2H-1,4-benzodiazepin-2-one, 5-(4'-tolyl)-7-chloro-1,3-dihydro-2H-1,4-benzodiazepin-2-one, and 5-phenyl-8-nitro-1,3-dihydro-2H-1,4-benzodiazepin-2-one.

The following examples are further illustrative of the present invention and it will be understood that the present invention is not limited thereto.

EXAMPLE 1

A mixture of 10 g. of tosyloxyacetic acid and 12.5 ml. of thionyl chloride was heated under reflux to dissolve the starting material and cease evolution of sulfur dioxide and hydrogen chloride. Thereafter, excess thionyl chloride was distilled thoroughly under reduced pressure to give tosyloxyacetyl chloride. Thereto was added 65 ml. of chloroform and 8.8 g. of 2-amino-5-chlorobenzophenone, and the mixture was refluxed for 32 hours to cease evolution of hydrogen chloride. After cooling, the reactant was poured into ice-water, and the chloroform layer was separated and washed with 5% sodium carbonate aqueous solution and water twice. And, then, the chloroform layer was dried over anhydrous sodium sulfate and chloroform was distilled to give yellow prisms of 5-chloro-2-(tosyloxyacetamido)-benzophenone almost quantitatively. Recrystallization from ethanol gave a pure product, M.P. 148–149° C.

Elementary analysis (for $C_{22}H_{18}ClNO_5S$)—Calculated (percent): C, 59.53; H, 4.09; N, 3.16; S, 7.22. Found (percent): C, 59.70; H, 4.03; N, 3.03; S, 7.36.

A mixture of 4.4 g. of 2-(tosyloxyacetamido)-5-chlorobenzophenone and 10% methanolic ammonia was stirred at room temperature for 3 days. Light yellow prisms of 2-(tosyloxyacetamido) - 5 - chloro-benzophenone were dissolved in methanol slowly to give a homogenous yellow solution after 3 days. The methanol solution was distilled under reduced pressure to a residue, to which was added water with stirring to give crystals. They are filtered, washed and dried to yield a crude product of 5-phenyl-7-chloro - 1,3 - dihydro-2H-1,4-benzodiazepin-2-one almost quantitatively. Recrystallization from alcohol or acetone gave pure crystals, M.P. 214–215° C.

Elementary analysis (for $C_{15}H_{11}ClN_2O$)—Calculated (percent): C, 66.55; H, 4.10; N, 10.35. Found (percent): C, 66.54; H, 4.03; N, 10.49.

By the above mentioned procedure, following compounds were prepared from corresponding 2-(tosyloxyacetamide)-benzophenone derivatives.

5-phenyl-7-methyl-1,3-dihydro-2H-1,4-benzodiazepin-2-one, M.P. 209–210° C.

5-phenyl-7-trifluoromethyl-1,3-dihydro-2H-1,4-benzodiazepin-2-one, M.P. 205–206° C.

5-phenyl-6-chloro-1,3-dihydro-2H-1,4-benzodiazepin-2-one, M.P. 243–245° C.

5-phenyl-9-chloro-1,3-dihydro-2H-1,4-benzodiazepin-2-one, M.P. 174–176° C.

5-(2'-chlorophenyl)-7-chloro-1,3-dihydro-2H-1,4-benzodiazepin-2-one, M.P. 199–201° C.

5-(3'-trifluoromethylphenyl)-1,3-dihydro-2H-1,4-benzodiazepin-2-one, M.P. 204–205° C.

EXAMPLE 2

According to the procedure of Example 1, 34.5 g. of tosyloxyacetic acid was treated with 62 g. of thionyl chloride to give tosyloxyacetyl chloride, to which was added 190 ml. of chloroform and 19 g. of 2-methylamino-5-chlorobenzophenone and the mixture was refluxed for 2 hours. The reactant was poured into about 400 ml. of ice-water, and the chloroform layer was separated and washed with 5% sodium carbonate aqueous solution and water twice. The chloroform solution was dried over anhydrous sodium sulfate and distilled under reduced pressure to give an oily substance. To the oily substance was added 30 ml. of methanol to be solidified to give white crystals of 31.1 g. (88.2%) of 5-chloro-2-(N-methyl-tosyloxyacetamido)-benzophenone.

Elementary analysis (for $C_{23}H_{20}ClNO_5S$)—Calculated (percent): C, 60.33; H, 4.37; N, 3.06. Found (percent): C, 59.98; H, 4.50; N, 3.18.

A solution of 9.15 g. (0.02 mole) of 5-chloro-2-(N-methyl-tosyloxyacetamido)-benzophenone in 400 ml. of chloroform containing 1.0 (w./v.) percent of ammonia was stirred at room temperature for 4 days. A resultant precipitate was removed by filtration and the filtrate was distilled to give a residue, which was dissolved in 10 ml. of methanol. The solution was allowed to cool to give crystals, which were filtered and washed with a small amount of petroleum benzine to yield 7-chloro-1-methyl-5 - phenyl - 1,3 - dihydro - 2H - 1,4 - benzodiazepin-2-one, M.P. 127.5–130° C.

The filtrate was concentrated to dryness under reduced pressure and the resultant solid was dissolved in 25 ml. of chloroform and extracted with 25 ml. of 4 N hydrochloric acid. The aqueous layer was adjusted to pH 9 with sodium carbonate and was extracted again with 25 ml. of chloroform. The chloroform layer was dried over anhydrous sodium sulfate, and the solution was distilled to give a residual product, which was dissolved in 2.5 ml. of methanol. The resultant crystals on cooling were collected by filtration to give 0.36 g. of second crystals of 7-chloro - 1 - methyl - 5-phenyl-1,3-dihydro-3H-1,4-benzodiazepin-2-one, M.P. 127.5–129° C. Total yield was 82.5%.

Elementary analysis (for $C_{16}H_{13}ClN_2O$)—Calculated (percent): C, 67.50; H, 4.50; N, 9.83; Cl, 12.45. Found (percent): First crystals—C, 67.81; H, 4.32; N, 10.01; Cl, 12.32. Second crystals—C, 67.81; H, 4.47; N, 10.13; Cl, 12.42.

EXAMPLE 3

A mixture of 9.16 g. of 5 - choro - 2 - (N-methyltosyloxyacetamido)-benzophenone and 400 ml. of chlorobenzene containing 0.3 (w./v.) percent ammonia was stirred at room temperature for 6 days. After the resultant precipitate was removed by filtration, the filtrate was distilled under reduced pressure to give a residue, which was then dissolved in 10 ml. of warm methanol. White granulars, which were produced on cooling, were collected by filtration and washed with a small amount of petroleum-ether to give 3.76 g. of 7 - chloro - 1 - methyl-3H-1,4-benzodiazepin-2-one, M.P. 125.5–128° C.

The filtrate was combined with the washings and then concentrated to dryness, and the resultant residue was dissolved in 2 ml. of methanol and the solution was allowed to cool. The produced crystals were collected by filtration to give 0.85 g. of 7 - chloro - 1 - methyl-5-phenyl-1,3-dihydro - 2H - 1,4 - benzodiazepin-one M.P. 124–127° C. as the second crystals. The total yield was 81.0%.

EXAMPLE 4

To a 1.1 (w./v.) percent solution of ammonia in 200 ml. of dimethyl formamide was added 4.58 g. of 5-chloro-2-(N - methyltosyloxyacetamido) - benzophenone. The solution was allowed to stand at room temperature for 5 days.

The solution was distilled under reduced pressure to give a residue, to which was added 100 ml. of chloroform.

The precipitate was removed by filtration, and the filtrate was washed with 30 ml. of 2% sodium carbonate aqueous solution and then with water. Then the solution was distilled under reduced pressure to give the residue, to which was added a small amount of methanol. The crystals were collected by filtration and washed with a small amount of petroleum-benzine to give 1.63 g. of 7-chloro-1 - methyl - 5 - phenyl-1,3-dihydro-2H-1,4-benzodiazepin-one, M.P. 125–127° C. The yield was 57.7%.

EXAMPLE 5

To a 0.3 (w./v.) percent solution of ammonia in 200 ml. of tetrahydrofuran, was added 4.58 g. of 5-chloro-2-(N-methyltosyloxyacetamido) - benzophenone. The solution was allowed to stand at room temperature for 40 hours.

The resultant precipitate was filtered and the filtrate was distilled under reduced pressure to give a residue, to which was added a small amount of methanol and was allowed to cool.

The resultant crystals were collected by filtration and washed with petroleum-benzine to give 1.84 g. of 7-chloro - 1 - methyl - 5-phenyl-1,3 - dihydro-2H - 1,4-benzodiazepin-2-one, M.P. 124–127° C. The yield was 64.4%.

EXAMPLE 6

To 200 ml. of 2 (w./v.) percent methanolic ammonia was added 4.58 g. of 5 - chloro - 2 - (N-methyl-tosyloxyacetamido) - benzophenone and the mixture was stirred at room temperature for 4 days. The solution was distilled under reduced pressure to give the residue, to which was added 50 ml. of pyridine. After the mixture was heated, it was allowed to cool. The precipitate was removed by filtration. The filtrate was concentrated to dryness under reduced pressure to give a residue, to which was added 30 ml. of ether, 100 ml. of benzene and 100 ml. of water. The mixture was shaken and then separated. The organic layer was extracted with 2 N hydrochloric acid. The aqueous layer was made alkaline with the addition of an aqueous solution of 3 N sodium hydroxide. The resultant mixture was extracted with dichloromethylene.

The extract was dried over anhydrous sodium sulfate. The solvent was removed under a reduced pressure to give the residue, to which was added a small amount of methanol, and the mixture was allowed to cool. The resultant crystals were collected by filtration and washed with petroleum-benzine to give 1.55 g. of 7-chloro-1-methyl - 5 - phenyl - 1,3-dihydro-2H-1,4-benzodiazepin-2-one, M.P. 127–130° C. The yield was 54.3%.

EXAMPLE 7

According to the procedure of Example 3, a reaction was carried out by using 2 - amino - 5 - nitrobenzophenone instead of 2 - amino - 5 - chlorobenzophenone in Example 2.

The reaction mixture was poured into ice-water. The chloroform layer was washed with an aqueous solution of 5% sodium carbonate and then with water and dried over anhydrous sodium sulfate. The chloroform solution was distilled under a reduced pressure to give 5-nitro-2(tosyloxyacetamido) - benzophenone almost quantitatively. Recrystallization from chloroform-methanol gave white crystals, M.P. 156–157° C.

Elementary analysis for $C_{22}H_{18}N_2O_7S$—Calculated (percent): C, 58.15; H, 3.96; N, 6.17; S, 7.05. Found (percent): C, 58.32; H, 3.91; N, 6.09; S, 6.94.

To a suspension of 4 g. of 5 - nitro - 2(tosyloxyacetamido)-benzophenone in 60 ml. of dioxane was added 20 ml. of 15% methanolic ammonia at 5 to 10° C. The mixture was stirred at room temperature for 24 hours. Then the solvent was distilled under reduced pressure to give a residue, to which was added 50 ml. of dry pyridine. The mixture was heated under reflux for 4 hours. The solvent was distilled off under reduced pressure to give a residue, which was poured into 50 ml. of water and was extracted with chloroform. The chloroform layer was extracted several times with 30 ml. of 2 N hydrochloric acid. The aqueous layer was neutralized with 28% ammonia aqueous solution and the precipitate was extracted with chloroform, and was dried over anhydrous sodium sulfate. Then the solution was distilled under reduced pressure to give a residue which was dissolved in monochlorobenzene. Thereafter petroleum-ether was added to the solution to give crystals of 5 - phenyl - 7 - nitro-1,3-dihydro - 2H - 1,4 - benzodiazepin, M.P. 223–224° C.

Elementary analysis (for $C_{15}H_{11}N_3O_3$)—Calculated (percent): C, 64.05; H, 3.94; N, 14.94. Found (percent): C, 64.12; H, 3.98; N, 14.90.

What we claim is:
1. A process for producing a compound of the formula

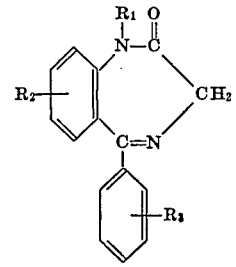

wherein $R_1$ is a hydrogen atom or lower alkyl group and $R_2$ and $R_3$ are each a hydrogen atom, halogen atom, nitro, lower alkyl or trifluoromethyl group, which comprises reacting a compound of the formula

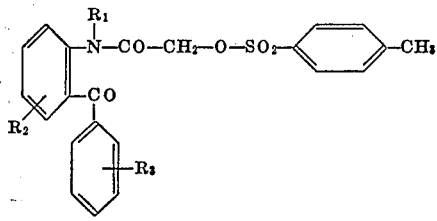

(IV)

wherein $R_1$, $R_2$ and $R_3$ are defined as above with ammonia in a solvent selected from the group consisting of methanol, ethanol, dioxane, tetrahydrofuran, chloroform, chlorobenzene, dimethyl formamide and dimethyl sulfoxide at a temperature of at least room temperature.

2. A process for producing a compound of the formula

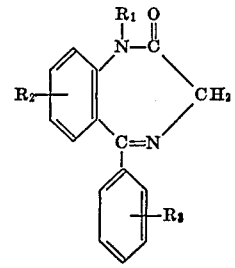

wherein $R_1$ is a hydrogen atom or lower alkyl group and $R_2$ and $R_3$ are each a hydrogen atom, halogen atom, nitro, lower alkyl or trifluoromethyl group, which comprises reacting a compound of the formula

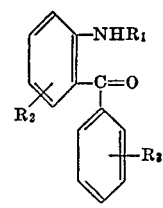

(II)

wherein $R_1$, $R_2$, and $R_3$ are defined as above with a compound of the formula

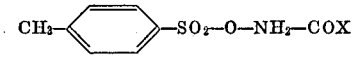

(III)

wherein X is a halogen atom, in a solvent selected from the group consisting of chloroform, benzene, tetrahydrofuran, methylene chloride, toluene, dimethyl formamide and dimethyl sulfoxide at a temperature of from room temperature to the boiling point of the solvent, to yield a compound of the formula

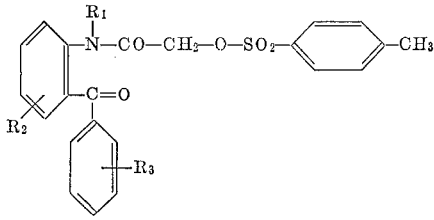

wherein $R_1$, $R_2$, and $R_3$ are defined as above and reacting the resultant compound with ammonia in a solvent selected from the group consisting of methanol, ethanol, dioxane, tetrahydrofuran, chloroform, chlorobenzene, dimethyl formamide and dimethyl sulfoxide at a temperature of at least room temperature.

3. A process for producing a compound of the formula

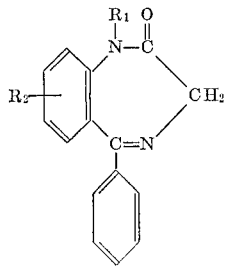

wherein $R_1$ is a lower alkyl group and $R_2$ is a halogen atom which comprises reacting a compound of the formula

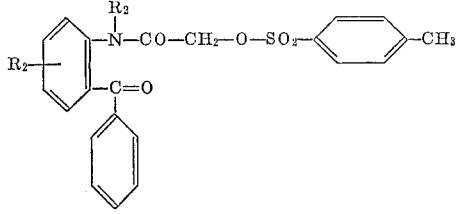

(VI)

wherein $R_1$ and $R_2$ are defined as above with ammonia at a concentration of 0.1 to 2 (w./v.) percent in a solvent selected from the group consisting of methanol, ethanol, dioxane, tetrahydrofuran, chloroform, chlorobenzene, dimethyl formamide and dimethyl sulfoxide at a temperature of at least room temperature.

4. A process according to claim 3 wherein said inert solvent is chloroform, chlorobenzene, tetrahydrofuran or dimethylformamide.

5. A process according to claim 1, wherein said compound (IV) is 5-chloro-2-(tosyloxyacetamido)-benzophenone.

6. A process according to claim 1, wherein said Compound (IV) is 5-nitro-2-(tosyloxyacetamido)-benzophenone.

7. A process according to claim 2, wherein said Compound (II) is 2-amino-5-chlorobenzophenone and said Compound (III) is tosyloxyacetyl chloride.

8. A process according to claim 2, wherein said Compound (II) is 2-amino-5-nitro-benzophenone and said Compound (III) is tosyloxyacetyl chloride.

9. A process according to claim 2, wherein said Compound (II) is 2-methylamino-5-chlorobenzophenone and said Compound (III) is tosyloxyacetyl chloride.

10. A process according to claim 3, wherein said Compound (VI) is 5-chloro-2-(N-methyltosyloxyacetamido)-benzophenone.

No references cited

JOHN D. RANDOLPH, Primary Examiner

R. T. BOND, Assistant Examiner

U.S. Cl. X.R.

260—456, 570, 999